PATENTED JUN 13 1972
3,668,850
INVENTOR
ALAN D. HORKEY
BY Hauke, Gifford & Patalidis
ATTORNEYS
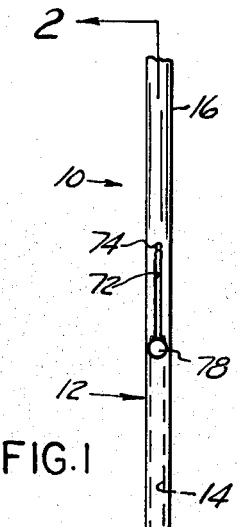
FIG.1
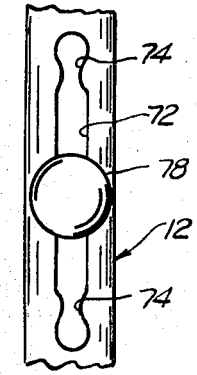
FIG.5
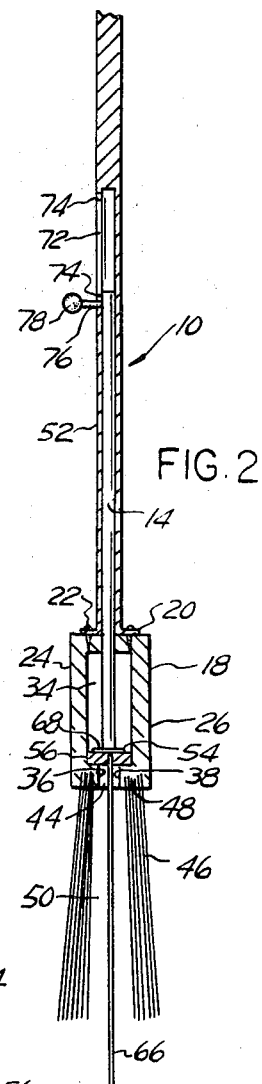
FIG.2
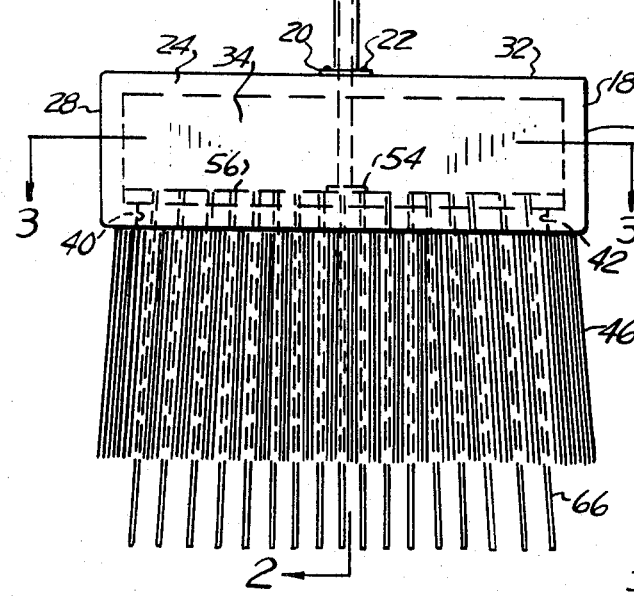
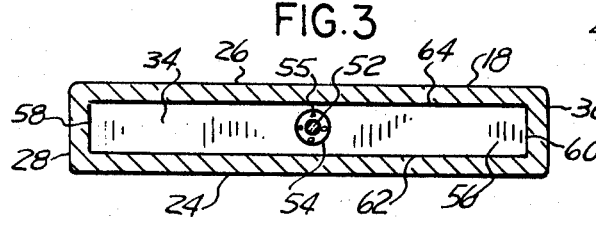
FIG.3
FIG.4

United States Patent
Horkey

[15] 3,668,850
[45] June 13, 1972

[54] RAKE AND BROOM COMBINATION

[72] Inventor: Alan D. Horkey, 5221 Tokay Drive, Lot 108, Flint, Mich. 48507

[22] Filed: May 13, 1970

[21] Appl. No.: 36,900

[52] U.S. Cl............................................56/400.04, 15/105
[51] Int. Cl.......................................A01d 7/04, A46b 15/00
[58] Field of Search..................15/105, 106, 111; 56/400.04, 56/400.05, 400.06, 400.07, 400.08, 400.17, 400.18; 119/85; 132/121

[56] References Cited

UNITED STATES PATENTS

| | | | |
|---|---|---|---|
| 1,014,404 | 1/1912 | May | 56/400.04 |
| 893,080 | 7/1908 | Kuettner | 15/111 |
| 1,280,180 | 10/1918 | Deason | 132/121 |
| 565,042 | 8/1896 | Slocum | 15/105 |
| 2,660,183 | 11/1953 | Gruring | 132/121 X |
| 3,324,494 | 6/1967 | Vosbikian | 15/105 |
| 2,816,305 | 12/1957 | Kravitt | 15/106 |

FOREIGN PATENTS OR APPLICATIONS 550,670   1/1943   Great Britain......................56/400.04

Primary Examiner—Daniel Blum
Attorney—Hauke, Gifford and Patalidis

[57] ABSTRACT

A rake and broom combination including a hollow handle having a hollow broom head secured to its lower end. The broom bristles are secured to the broom head and form an elongated hollow oval-shaped structure. A shaft is slidably mounted within the hollow handle and has a rake teeth bar transversely secured to its lower end and disposed within the broom head. Rake teeth are secured to the rake teeth bar and extend downwardly within the oval formed by the broom bristles. When the shaft is secured in its upper position, the broom bristles extend beyond the lower end of the rake teeth and the combination may be used as a broom. When the shaft is secured in its lower position, the rake teeth extend beyond the broom bristles and the combination may be used as a rake.

3 Claims, 5 Drawing Figures

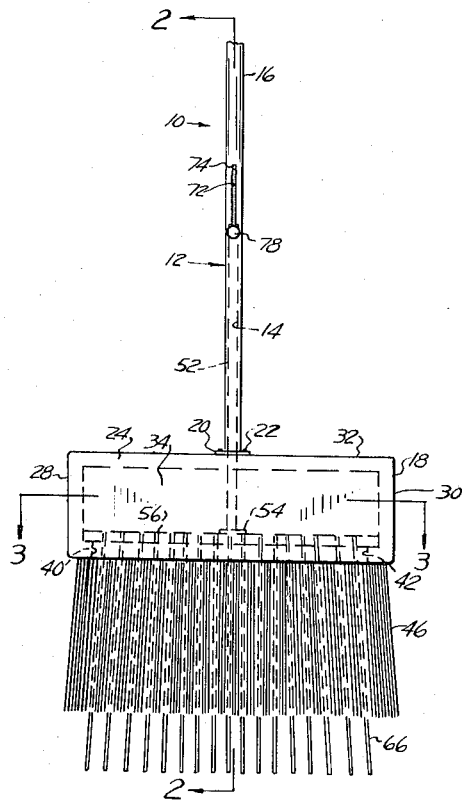

3,668,850

RAKE AND BROOM COMBINATION

BACKGROUND OF THE INVENTION

1. Field Of The Invention

The present invention relates generally to combined rakes and brooms, and more particularly to a combination wherein the rake teeth are slidably mounted with respect to the broom bristles.

2. Description Of The Prior Art

Many types of combinations of rake and broom devices have been made, one being illustrated in U.S. Pat. No. 484,156, issued Oct. 11, 1892 to J. W. Koonce, wherein the broom bristles extend downwardly from the broom head and are substantially parallel to the broom handle. The rake teeth are secured in the broom head and are approximately perpendicular to the broom bristles.

Since both the broom bristles and the rake teeth are fixedly secured to the broom head, both are exposed for use at all times. The disadvantages of such a device include the fact that the rake teeth will very likely hinder the operation of the combination as a broom and the broom bristles will probably hinder the operation of the combination as a rake.

SUMMARY OF THE INVENTION

The rake and broom combination of the present invention includes a hollow handle and a broom head secured to the lower end thereof. The broom head has a downwardly opening elongated chamber with the broom bristles secured therearound, such that the broom bristles form an oval-shaped ring in cross section.

A shaft is slidably mounted within the hollow handle and has its lower end extending into the broom head chamber. An elongated rake teeth bar is disposed within the broom head chamber and secured to the lower end of the shaft with its axis of elongation substantially perpendicular to the axis of elongation of the shaft. A plurality of rake teeth have one end secured in spaced relation along the length of the rake teeth bar and extend downwardly through the oval-shaped space within the broom bristles and are substantially parallel to the broom bristles. The broom bristles and the rake teeth are of such a length that when the shaft is pulled to its upper position within the rake handle and secured thereto, the broom bristles extend beyond the rake teeth such that the device may be used as a broom. When the shaft is pushed to its lower position within the rake handle and secured thereto, the rake teeth extend beyond the lower end of the broom bristles such that the device may then be used as a rake.

Thus, the rake teeth are disposed within an elongated space surrounded by broom bristles. The rake teeth are disposed substantially parallel to the broom bristles and slidably mounted such that in one position the broom bristles extend beyond the rake teeth and the combination can be used for sweeping. In a second position the rake teeth extend beyond the lower end of the broom bristles and the combination may be used as a rake. In each position one type of operation is not hindered by the mechanism of performing the alternate type of operation.

BRIEF DESCRIPTION OF THE DRAWINGS

The description refers to the accompanying drawings wherein like reference characters refer to like parts throughout the several views, and in which:

FIG. 1 is a fragmentary plan view of the combination of the present invention having the rake teeth disposed in their lower position;

FIG. 2 is a cross-sectional view taken along line 2—2 of FIG. 1;

FIG. 3 is a cross-sectional view taken along line 3—3 of FIG. 1;

FIG. 4 is a cross-sectional view similar to FIG. 2 but having the rake teeth disposed in their upper position; and FIG. 5 is a fragmentary exploded view of the slot and handle arrangement shown in FIG. 1.

DESCRIPTION OF THE PREFERRED EMBODIMENT

Referring to FIG. 1, the rake and broom combination, generally indicated at 10, includes a handle 12 which is preferably hollow at its lower end forming a cylindrical chamber 14. The handle 12 is preferably solid at its upper end 16, but may be hollow along its entire length with a cap covering an upper opening as is well known in the art.

Referring to FIGS. 1 and 2, an elongated broom head 18 is secured to the lower end of the handle 12 with its axis of elongation substantially perpendicular to the axis of elongation of the handle 12. The handle 12 preferably includes a radially extending flange 20 formed on its lower end for receiving screws 22 for securing the handle to the broom head, but it will be understood that the handle may be secured to the broom head by any convenient means, as by welding, bonding or the like.

The broom head 18 is preferably formed from a pair of rectangular parallel side panels 24 and 26, a pair of rectangular parallel end panels 28 and 30 and a top rectangular panel 32. The panels form a parallelepiped shaped chamber 34 therein. The lower edges of the side panels 24 and 26 are formed with inwardly extending flanges 36 and 38 and the lower edges of the end panels 28 and 30 are formed with inwardly extending flanges 40 and 42, forming a rectangular slot 44 between their inner edges. Broom bristles 46, which may be formed of any conventional material, have one end secured in recesses 48 formed in the flanges 36, 38, 40 and 42, as by bonding or the like. The broom bristles 46 extend downwardly from the recesses 48 with their axes of elongation substantially parallel to the axis of elongation of the handle 12 and form a space 50 therebetween along their length for reasons to be described.

The rake portion of the combination includes a shaft 52 slidably mounted within the chamber 14 and having its lower end extending into the chamber 34. The shaft 52 preferably includes a radially extending flange 54 formed at its lower end for receiving screws 55 for securing the shaft 52 to the midportion of an elongated bar 56 with the axis of elongation of the bar 56 substantially perpendicular to the axis of elongation of the shaft 52. It will be understood that the shaft may be secured to the bar 56 by any convenient means other than the flange and screw arrangement, such as by welding, bonding or the like. The bar 56 is preferably substantially rectangular in cross-section and has its end edges 58 and 60 disposed immediately adjacent the inner surfaces of the end panels 28 and 30 and its longitudinal edges 62 and 64 disposed immediately adjacent the inner surfaces of the side panels 24 and 26 for reasons to be described.

Elongated rake teeth 66 have one end secured as by welding, bonding or the like in slots 68 formed in spaced relation along the length of the bar 56. The rake teeth 66 extend downwardly from the bar 56 through the slot 44 and the space 50 with their axes of elongation substantially parallel to the axes of elongation of the broom bristles 46. The teeth 66 preferably have their free end bent over as at 70 in conventional fashion for rake teeth.

Referring to FIGS. 1, 2 and 5, the handle 12 includes an elongated slot 72 formed substantially parallel to the axis of elongation of the handle and intersecting the upper end of the chamber 14. The slot 72 has a pair of inwardly extending tabs as at 74 formed adjacent each end for reasons to be described.

The shaft 52 includes a stud 76 extending radially outward from a point adjacent its upper end through the slot 72. A ball-type handle 78 may be secured to the outer end of the stud 76.

Referring to FIGS. 1 and 2, with the bar 56 in its lower position adjacent the flanges 36, 38, 40 and 42 the rake teeth 66 extend beyond the broom bristles 46 such that the combination 10 may be used as a rake. It will be noted that the broom bristles 46 are positioned such that they will not interfere with the operation of the combination as a rake. The bar 56 is maintained in its lower position by the shaft 52, the stud 76 and the lower pair of tabs 74, which secure the stud 76 in the lower end of the slot 72. Preferably, either the tabs 74 or the stud 76 are formed from resilient material such that the stud 76 may be easily pushed through the tabs and secured thereby.

When it is desired to use the combination 10 in its broom mode, the shaft 52 may be slid upward in the chamber 14 by means of the stud 76 and handle 78, pulling the bar 56 upward in the chamber 34. The stud 76 may then be pushed through the upper pair of tabs 74, securing the bar 56 in its upper position adjacent the top panel 32. Referring to FIG. 4, with the bar 56 secured in its upper position the broom bristles 46 extend beyond the lower end of the rake teeth 66 such that the combination 10 may be used as a broom. It will be noted that with the rake teeth in their upper position they are totally enclosed within the chamber 34, slot 44 and the space 50 such that they will not interfere with the use of the combination 10 as a broom.

It will be noted that the bar 56 is closely fitted to the inner surfaces of the panels 24, 26, 28 and 30 so as to prevent rotation about the axis of the shaft 52 when the combination is being used as a rake and to maintain the bar 56 and the rake teeth 66 in the proper position when they are in their upper position.

Thus, a combination rake and broom is provided wherein the rake teeth are disposed substantially parallel to the broom bristles and are slidably mounted on the broom handle. The arrangement allows the combination to be used as a broom without the rake teeth interferring therewith or, as a rake without the broom bristles interferring therewith.

Although I have described but one preferred embodiment of my invention, it is to be understood that various changes and revisions can be made therein without departing from the spirit of the invention or the scope of the appended claims.

I claim:

1. A combination broom and rake, comprising:

an elongated handle; a broom head secured to one end of said handle; broom bristles secured to said broom head and extending away from said handle; rake teeth movably mounted to said handle and disposed adjacent said broom bristles, the axis of elongation of said broom bristles and said rake teeth being substantially parallel to the axis of elongation of said handle, said teeth being movable between a first position wherein said teeth are positioned to be used and a second position wherein said teeth are retracted from said first position into said bristles and said broom bristles are positioned to be used, said broom head including a chamber having an opening, said broom bristles being secured to the broom head around said opening and extending outwardly therefrom and including an elongated member slidably mounted within said chamber and having said rake teeth secured thereto and extending through said opening, the outer ends of said rake teeth extending beyond the outer ends of said broom bristles when said rake teeth are in said first position and the outer ends of said broom bristles extending beyond the outer ends of said rake teeth when said rake teeth are in said second position.

2. A combination broom and rake, comprising: an elongated handle; a broom head secured to one end of said handle; broom bristles secured to said broom head and extending away from said handle; rake teeth movably mounted to said handle and disposed adjacent said broom bristles, said teeth being movable between a first position wherein said teeth are positioned to be used and a second position wherein said teeth are retracted from said first position and said broom bristles are positioned to be used, said broom head including a chamber having an opening, said broom bristles being secured to said broom head around said opening and extending outwardly therefrom, an elongated member slidably mounted within said chamber, said rake teeth being secured thereto and extending through said opening with their axes of elongation substantially parallel to the axis of elongation of said broom bristles; the axes of elongation of said broom bristles and said rake teeth are substantially parallel to the axis of elongation of said handle.

3. A combination broom and rake, comprising: an elongated handle; a broom head secured to one end of said handle; broom bristles secured to said broom head and extending away from said handle; rake teeth movably mounted to said handle and disposed adjacent said broom bristles, said teeth being movable between a first position wherein said teeth are positioned to be used and a second position wherein said teeth are retracted from said first position and said broom bristles are positioned to be used, said broom head including a chamber having an opening, said broom bristles being secured to said broom head around said opening and extending outwardly therefrom, an elongated member slidably mounted within said chamber, said rake teeth being secured thereto and extending through said opening with their axes of elongation substantially parallel to the axis of elongation of said broom bristles; the outer ends of said rake teeth extending beyond the outer ends of said broom bristles when said rake teeth are in said first position, and the outer ends of said broom bristles extending beyond the outer ends of said rake teeth when said rake teeth are in said second position; the portion of said handle adjacent said broom head being tubular and having an elongated slot formed therein and extending substantially parallel to the axis of elongation of said handle, and including a shaft having one end secured to said elongated member and the other end extending into said tubular portion, and a second elongated member having one end secured to said shaft and extending through said slot for moving said rake teeth between said first and second positions.

* * * * *